T. L. LILLY.
TRUCK HOIST.
APPLICATION FILED DEC. 16, 1918.
1,341,142.
Patented May 25, 1920.
2 SHEETS—SHEET 1.
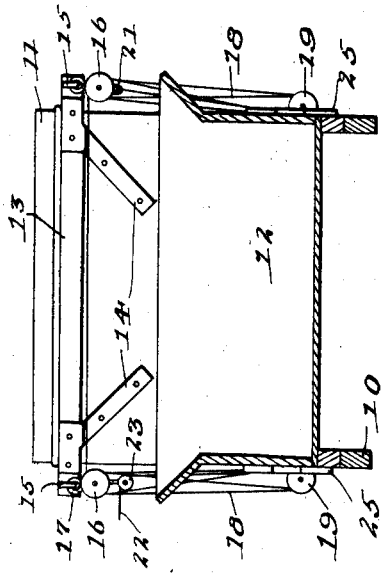
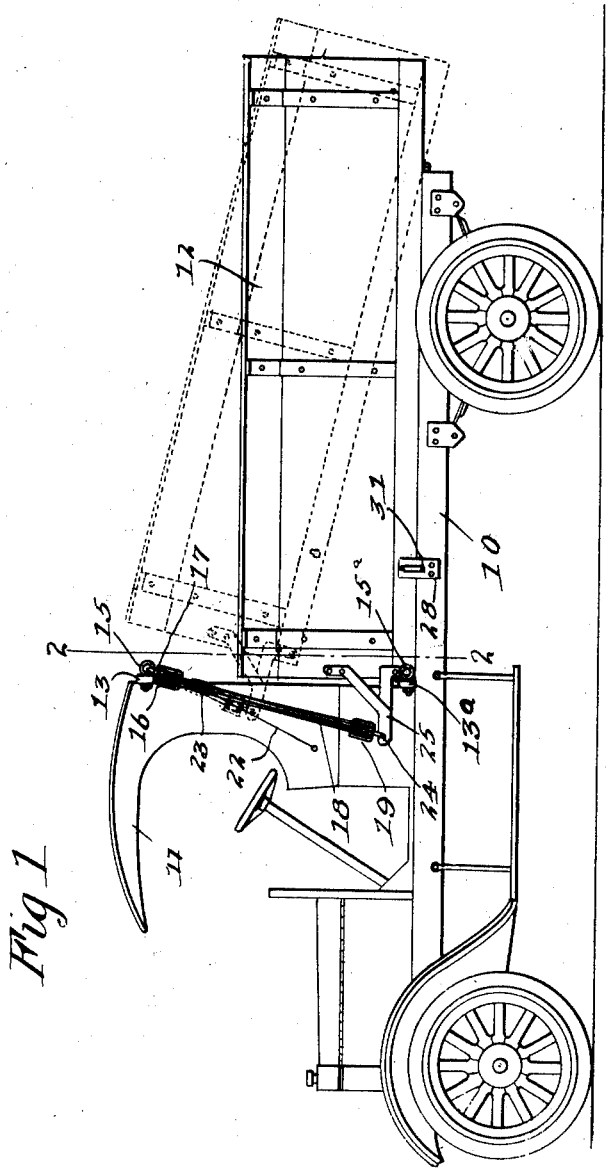
Witnesses
R. A. Thomas
Inventor
T. L. Lilly.
By Victor J. Evans
Attorney T. L. LILLY.
TRUCK HOIST.
APPLICATION FILED DEC. 16, 1918.
1,341,142.
Patented May 25, 1920.
2 SHEETS—SHEET 2.
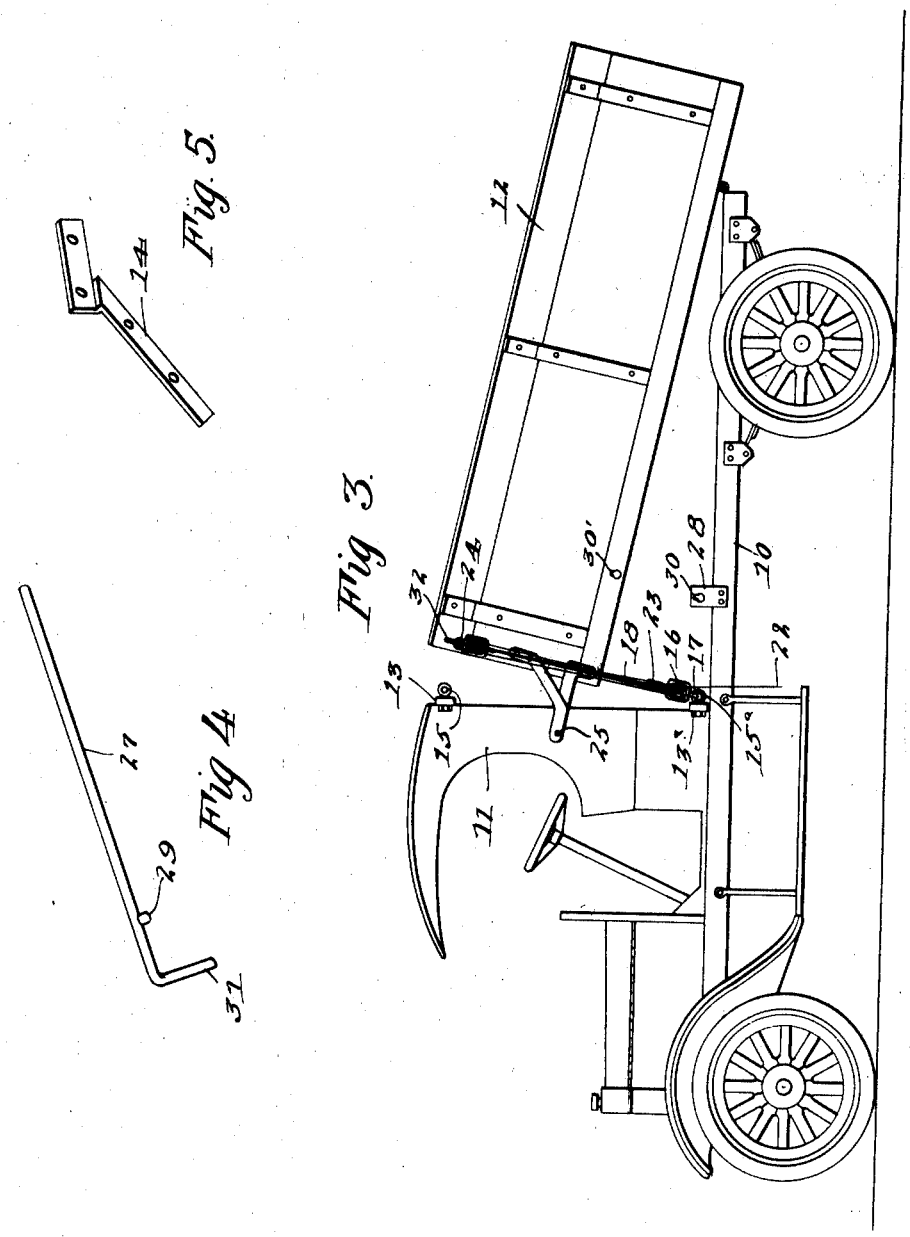
Witnesses
R. A. Thomas
Inventor
T. L. Lilly
By Victor J. Evans
Attorney

UNITED STATES PATENT OFFICE.

THOMAS L. LILLY, OF MINONK, ILLINOIS.

TRUCK-HOIST.

1,341,142.  Specification of Letters Patent.  Patented May 25, 1920.

Application filed December 16, 1918. Serial No. 267,084.

*To all whom it may concern:*

Be it known that I, THOMAS L. LILLY, a citizen of the United States, residing at Route No. 1, box 12, Minonk, in the county of Woodford and State of Illinois, have invented new and useful Improvements in Truck-Hoists, of which the following is a specification.

The object of this invention is to provide a device suitable for attachment to auto trucks and similar vehicles having tilting or dump bodies whereby the latter may be moved from the normal or carrying position to a dumping position with comparatively slight effort on the part of the operator, or may be moved from the dumping position to an elevated or normal position for raising loads or facilitating the loading of heavy objects upon the truck where supplemental hoisting means, derricks and the like, are not available, and more especially to provide an apparatus for the purpose indicated which may be applied to any of the ordinary or conventional forms of trucks without materially altering the construction of the latter and without any reorganization or rearrangement of the parts thereof.

Further objects will appear in the course of the following description describing the preferred embodiment, it being understood that changes in form, proportion and detail may be resorted to, within the scope of the appended claims, without departing from the principles involved.

In the drawings:

Figure 1 is a side view of a truck provided with a hoisting mechanism constructed in accordance with the present invention, the body being shown in dotted lines in its tilted or dumped position, Fig. 2 is a rear view, partly in section, to show the relation between the hoisting mechanism and the dumped body, Fig. 3 is a side view showing the arrangement of parts when the cab is to be returned from tilted position onto the truck, Fig. 4 is a detailed view of the locking device for retaining the body in its normal or horizontal position, Fig. 5 is a detailed view of one of the braces employed for the transverse bars by which the cables are connected with the truck cab.

The apparatus constituting the invention is shown in the drawing as applied to an ordinary or conventional form of truck of the tilting or dump body type, the truck proper shown at 10 having the usual cab 11 and having tiltably mounted thereon the body 12, and secured to the back of the cab is a transverse bar 13 having suitable braces 14, and serving as a support for eye bolts 15 with which are connected the upper pulley blocks 16, this attachment being removable by means of hooks 17 so that the mechanism may be used interchangeably with the upper bars 13 and a similar transverse lower bar 13ª also provided with eye bolts 15ª, as hereinafter explained in detail.

The pulley blocks 16 each carry two pulleys. Below each of the pulley blocks 16 is a lower pulley block 19. These pulley blocks also carry two pulleys. One of the upper pulley blocks 16 has a depending bale 21. To this bale is secured one end of a cable 18. The cable is directed around one of the pulley wheels in the pulley block 19 directly below the referred to pulley block 16, and is again directed around the second pulley block 19 and over the second pulley in the block 16. The cable is then directed to one of the pulleys on the second pulley block 16, and from thence downward and around one of the pulleys in the second pulley block 19, and from thence around the second pulley in the pulley block 16, around the second pulley in the pulley block 19, and from thence over a pulley 23 supported from the second mentioned upper pulley block 16. For distinction the end of the cable is indicated by the numeral 22, and by applying draft to the said end 22, manually or otherwise the cable will raise the lower pulley blocks toward the upper pulley blocks.

In Figs. 1 and 2 of the drawings the upper pulley blocks are connected to the eye bolts 15 of the bars 13, while the lower pulley blocks 19 are connected to hooks or grapples 24 on the end of brackets 25 which latter are secured to the sides at the front of the tiltable body 12. By these means the body may be moved from the horizontal normal position, indicated in full lines in Fig. 1, to the dumping position indicated by the dotted lines in the said Fig. 1. When the body is in its normal or carrying position it may be secured by a locking rod 27 which is engageable with transverse alined ears 28 on the truck frame. The rod has a lug 29 for passage through a notch 30 that communicates with the opening in one of the ears 28. The rod 27 has an offset end that provides a handle 31 which is extended in the same direction as the lug 29. The handle adds weight to one end of the rod so that the said handle portion will gravitate to a vertical position and bring the lug 29 out of alinement with the notch 30 in the referred to ear 28. The rod passes through openings 30' in the lower longitudinal frame members of the body 12 and is removed only when the body is to be dumped.

When it is desired to utilize the hoisting mechanism as a means of assisting in the loading of the body as by the raising of a heavy object with which the body may be engaged while in its said tilted or dotted line position, as shown in Fig. 2, the terminal hooks 24 of the tackle represented by the pulley blocks and cables should be engaged with eyes 32 at the top of the front of the body, as shown in Fig. 3, and the hooks 17 should be engaged with the eyes 15ª on the lower transverse bar secured to the back of the cab, whereupon draft applied manually or otherwise to the running end of the cable will serve to draw the front end of the body downward and thus by elevating its rear end forcibly serve to raise the load with which the rear end of the body may be engaged, until it can be received by the body in a horizontal or loaded position.

From the foregoing description it will be seen that the only modification of a truck of the ordinary construction necessary in order to apply the hoisting apparatus embodying the invention is to attach to the rear side of the cab the pair of bars which carry the eye bolts serving as means for engagement of the upper hook elements of the tackle, and the provision of corresponding eyes on the front of the tilting body for engagement by the hooks 24 on the lower or movable blocks of the tackle, together with suitable means, if the truck is otherwise unprovided therewith, for efficiently maintaining the tilting body in its normal or carrying position.

Whereas it has been deemed unnecessary to specifically illustrate the same, it will be obvious that any suitable or ordinary form of windlass may be employed as a means of applying draft to the free or running end of the cable in lieu of manually operating the same directly, but by reason of the fact that several runs of the cable are preferably provided between the relatively stationary and movable blocks of the tackle, a very forcible movement in either direction of the front end of the body may be effected with a comparatively slight strain applied to the free end of the cable, so that except in extraordinary cases, the use of special means for applying draft to the cable will be found unnecessary.

Having described the invention, I claim:

1. Hoisting mechanism for tilting truck bodies, having a tackle consisting of relatively stationary and movable pulley blocks and a cable having running connection in series with said blocks, one end of the cable being secured to a becket on one of the stationary blocks, and the free end of the cable extending through a guide on the becket of the other stationary block, and means for detachably connecting said stationary and movable blocks respectively to a truck frame and the tilting body.

2. The combination with a truck having a tilting body, of a tackle consisting of pairs of pulley blocks connected by a running cable and provided respectively with anchoring hooks, and upper and lower pairs of eyes on the truck and corresponding upper and lower pairs of eyes on the body for engagement respectively with said hooks.

3. The combination with a truck having a tilting body and a means for securing the latter in its normal or carrying position, of transverse upper and lower bars carried by the truck cab and provided with eyes, corresponding eyes carried by the front end of the body, and a tackle consisting of upper and lower pairs of pulley blocks provided respectively with hooks for engagement with said eyes on the truck cab and body, and the running cable traversing said pulley blocks.

In testimony whereof I affix my signature.

THOMAS L. LILLY.